US011952205B2

(12) United States Patent
Choi et al.

(10) Patent No.: US 11,952,205 B2
(45) Date of Patent: Apr. 9, 2024

(54) PANEL TRANSFER TRAY AND METHOD FOR TRANSFERRING TRAY USING THE SAME

(71) Applicant: SAMSUNG DISPLAY CO., LTD., Yongin-si (KR)

(72) Inventors: Hyongdo Choi, Anseong-si (KR); Sunghee Lee, Asan-si (KR); Myung-Seok Kwon, Namyangju-si (KR); Deok-Hwan Kim, Asan-si (KR); Sung-Jun Kim, Hwaseong-si (KR); Yun-Tae Kim, Seoul (KR); Jinseok Kim, Cheonan-si (KR); Hasook Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 44 days.

(21) Appl. No.: 17/603,378

(22) PCT Filed: Apr. 16, 2020

(86) PCT No.: PCT/KR2020/005102
§ 371 (c)(1),
(2) Date: Oct. 13, 2021

(87) PCT Pub. No.: WO2020/256266
PCT Pub. Date: Dec. 24, 2020

(65) Prior Publication Data
US 2022/0204252 A1   Jun. 30, 2022

(30) Foreign Application Priority Data
Jun. 19, 2019   (KR) ........................ 10-2019-0072884

(51) Int. Cl.
*B65D 85/48*   (2006.01)
*B65D 81/05*   (2006.01)
(Continued)

(52) U.S. Cl.
CPC ........... *B65D 85/48* (2013.01); *B65D 81/054* (2013.01); *B65G 57/005* (2013.01); *B65G 57/02* (2013.01);
(Continued)

(58) Field of Classification Search
CPC .... B65D 85/48; B65D 81/054; B65D 81/056; B65D 2581/051
(Continued)

(56) References Cited

U.S. PATENT DOCUMENTS 3,870,152 A * 3/1975 Kaplan ................ B65D 81/056
206/523
D270,621 S * 9/1983 Sala .............................. D9/456
(Continued)

FOREIGN PATENT DOCUMENTS

CN   104139929 A   11/2014
CN   109178566 A   1/2019
(Continued)

OTHER PUBLICATIONS

International Search Report dated Jul. 21, 2020 for PCT/KR2020/005102.
Written Opinion dated Jul. 21, 2020 for PCT/KR2020/005102.

*Primary Examiner* — Steven A. Reynolds
(74) *Attorney, Agent, or Firm* — CANTOR COLBURN LLP

(57) ABSTRACT

A panel transfer tray according to an embodiment includes an accommodation part which accommodates a target panel, a protrusion protruding upward direction from an upper edge of the accommodation part, and a first movement prevention member disposed at one side of the accommodation part and disposed adjacent to the protrusion, and the first movement prevention member has a stair shape of which a planar area gradually decreases along the upward direction.

9 Claims, 13 Drawing Sheets

(51) Int. Cl.
  *B65G 57/00*    (2006.01)
  *B65G 57/02*    (2006.01)
(52) U.S. Cl.
  CPC .................. *B65D 2581/051* (2013.01); *B65D 2585/6837* (2013.01); *B65G 2201/022* (2013.01); *B65G 2201/0258* (2013.01); *B65G 2814/0305* (2013.01)
(58) Field of Classification Search
  USPC ........................................ 206/454, 453, 586
  See application file for complete search history.

(56) References Cited

U.S. PATENT DOCUMENTS

| | | | |
|---|---|---|---|
| 6,368,694 B1* | 4/2002 | Marsh ................. | B65D 81/055 229/199 |
| 9,676,509 B2 | 6/2017 | Shin et al. | |
| 2006/0124478 A1 | 6/2006 | Marcao et al. | |
| 2016/0009453 A1* | 1/2016 | Yue ....................... | B65D 25/10 206/706 |
| 2020/0189825 A1* | 6/2020 | Nakamichi ............ | B65D 85/48 |

FOREIGN PATENT DOCUMENTS

| | | | |
|---|---|---|---|
| JP | 2010285156 A | 12/2010 | |
| KR | 100797542 B1 | 1/2008 | |
| KR | 1020110071575 A | 6/2011 | |
| KR | 2020150000685 U | 2/2015 | |
| KR | 1020150062605 A | 6/2015 | |
| KR | 101687141 B1 | 12/2016 | |
| KR | 101864485 B1 | 6/2018 | |
| KR | 1020180133655 A | 12/2018 | |

* cited by examiner

PANEL TRANSFER TRAY AND METHOD FOR TRANSFERRING TRAY USING THE SAME

TECHNICAL FIELD

The present invention relates to a panel transfer tray and a method for transferring a panel using the same. More particularly, the present invention relates to a panel transfer tray that is capable of loading a plurality of target panels having a reduced dead space, and a method for transferring a panel using the same.

BACKGROUND ART

A tray for transferring a display panel is used when at least one display panel is laminated, or a display panel is transferred in an intermediate process. In order to reduce costs, a plurality of display panels is laminated on the tray than then are stored and transported.

In order to reduce a dead space of the display panel, studies on a method in which existing components, which are connected in parallel to each other, such as a flexible circuit board, are vertically connected to each other are being conducted. However, when display panels, in which the flexible circuit board is vertically connected, are laminated, like the typical method, interference between upper and lower display panels may occur, and thus different lamination methods are desirable.

DISCLOSURE OF THE INVENTION

Technical Problem

An aspect of the present invention is to provide a panel transfer tray capable of laminating a plurality of target panels, each of which has a reduced dead space.

An aspect of the present invention is to provide a method for transferring a panel, in which a plurality of target panels, each of which has a reduced dead space, are laminated on a tray to reduce storage and transfer costs.

Technical Solution

A panel transfer tray according to an embodiment of the present invention includes an accommodation part which accommodates a target panel, a protrusion protruding an upward direction from an upper edge of the accommodation part, and a first movement prevention member disposed at a first corner of the accommodation part and disposed adjacent to the protrusion. The first movement prevention member has a stair shape of which a planar area gradually decreases along the upward direction in a plan view.

The accommodation part may include an accommodation surface parallel to a plane defined by a first direction and a second direction crossing the first direction, and the first direction and the second direction cross the upward direction.

The protrusion may include a first protrusion extending along the first direction and a second protrusion extending along the second direction. The first movement prevention member may be disposed adjacent to a connection point at which the first protrusion and the second protrusion are connected to each other.

The panel transfer tray according to an embodiment of the present invention may further include a second movement prevention member disposed at a second corner spaced apart from the first corner at which the first movement prevention member is disposed.

The second movement prevention member may have a shape that alternately extends along the first direction and the second direction in the plan view.

The second movement prevention member may include a first sub movement prevention member spaced apart from the first movement prevention member along the first direction and a second sub movement prevention member spaced apart from the first movement prevention member along the second direction.

The panel transfer tray according to an embodiment of the present invention may further include a third movement prevention member disposed to be spaced apart from the first movement prevention member along the first direction and the second direction, spaced apart from the first sub movement prevention member along the second direction, and spaced apart from the second sub movement prevention member along the first direction.

The third movement prevention member may have an inverted stair shape of which a planar area gradually increases along the upward direction.

The first movement prevention member may include a first layer, a second layer, and a third layer, which are sequentially laminated along the upward direction. The second layer may have a planar area less than a planar area of the first layer, and the third layer may have a planar area less than the planar area of the second layer.

Each of the first layer, the second layer, and the third layer of the first movement prevention member may define a fixing part recessed in the first direction and the second direction in the plan view to fix the target panel.

The panel transfer tray according to an embodiment of the present invention may further include a stage which is disposed at a center of the accommodation part and on which the accommodation surface is defined so that the target panel is seated.

A method for transferring a panel according to an embodiment of the present invention includes sequentially loading a plurality of panels on a transfer tray and moving the transfer tray on which the plurality of panels is loaded. The loading of the plurality of panels includes loading a first panel on the transfer tray so as to be parallel to a plane defined by a first direction and a second direction crossing the first direction and loading a second panel on the first panel so as to be shifted from the first panel by a first predetermined distance along the first direction, and the plurality of panels includes the first panel and the second panel.

In the loading of the second panel, the second panel may be loaded to be shifted from the first panel by a second predetermined distance along the second direction.

The transfer tray may include a first movement prevention member which prevents the first panel and the second panel from moving. The first movement prevention member may include a first layer on which a first fixing part which fixes the first panel is defined and a second layer which is disposed on the first layer and on which a second fixing part which fixes the second panel is defined.

The transfer tray may further include a second movement prevention member disposed to be spaced apart from the first movement prevention member. The first panel and the second panel may be loaded to be fixed by the first movement prevention member and the second movement prevention member.

The transfer tray may further include a third movement prevention member spaced apart from the first movement prevention member and the second movement prevention member. The third movement prevention member may have an inverted stair shape of which a planar area gradually increases along the upward direction. The upward direction crosses the first direction and the second direction. The loading of the plurality of panels may further include disposing the third movement prevention member after the loading of the first panel and the second panel.

The loading of the plurality of panels may further include disposing a protective pad between the first panel and the second panel.

Each of the first panel and the second panel may include a panel body part and a film part connected to the panel body part. The panel body part may be parallel to the plane defined by the first direction and the second direction, and the film part may be connected to extend along an upward direction crossing the first direction and the second direction.

In the loading of the plurality of panels, the first panel and the second panel are loaded so that the film part of the first panel and the film part of the second panel may be not to overlap each other in a plan view.

The loading of the plurality of panels may further include loading a third panel to be shifted from the second panel by a third predetermined distance along the first direction after the loading of the second panel.

Advantageous Effects

According the embodiment of the present invention, the target panel, to which the film part is vertically connected, may be laminated in plurality on the tray to reduce the storage and transfer costs.

MODE FOR CARRYING OUT THE INVENTION

Figure 1A:
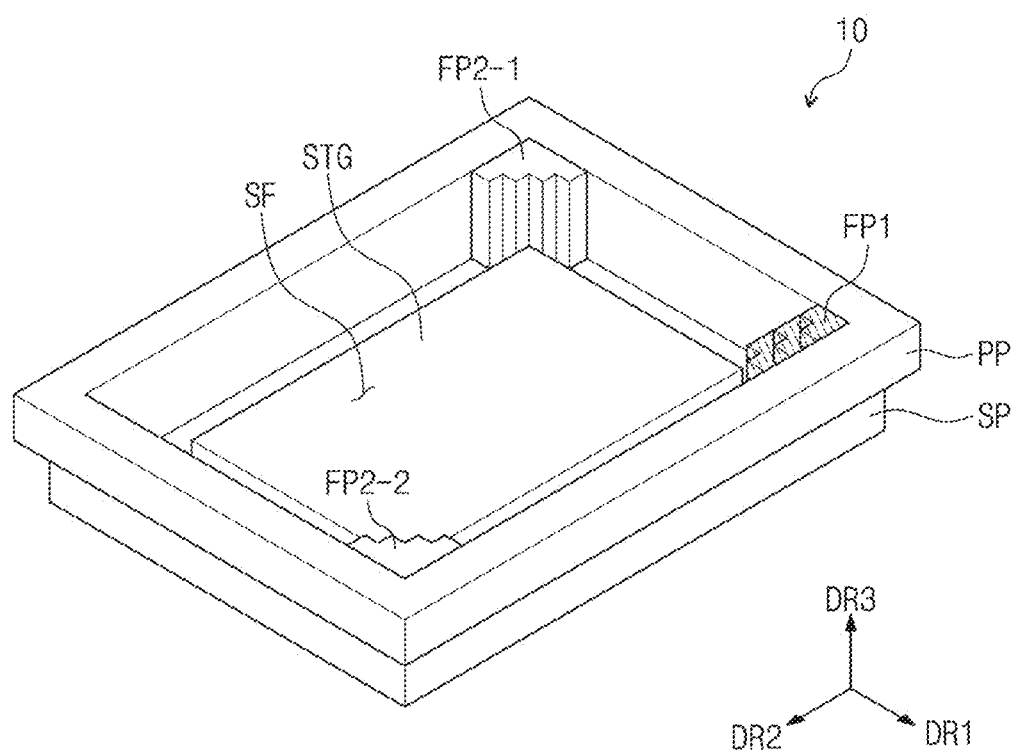
FIG. 1A is a schematic perspective view of a panel transfer tray according to an embodiment of the present invention.

Embodiments of the present invention will be described below in more detail with reference to the accompanying drawings. Since the present invention may have diverse modified embodiments, specific embodiments are illustrated in the drawings and are described in the detailed description of the present invention. However, this does not limit the present invention within specific embodiments and it should be understood that the present invention covers all the modifications, equivalents, and replacements within the idea and technical scope of the present invention.

In descriptions of each drawing, like reference numerals refer to like elements throughout. In the accompanying drawings, the dimensions and size of each structure are exaggerated, omitted, or schematically illustrated for convenience in description and clarity. It will be understood that although the terms such as 'first' and 'second' are used herein to describe various elements, these elements should not be limited by these terms. The terms are only used to distinguish one component from other components. For example, a first element referred to as a first element in an embodiment can be referred to as a second element in another embodiment without departing from the scope of the appended claims. The terms of a singular form may include plural forms unless referred to the contrary.

In the present application, it is to be understood that terms such as "include" or "have" are intended to designate that a feature, number, process, operation, component, part, or combination thereof described in the specification exists, but does not preclude the possibility of addition or existence of one or more other features, numbers, processes, operations, components, parts, or combinations thereof.

In this specification, it will be understood that when a layer, a film, a region, or a plate is referred to as being "on" or "on an upper portion of" another layer, film, region, or plate, it can be directly on the other layer, film, region, or plate, or intervening layers, films, regions, or plates may also be present. On the contrary to this, it will be understood that when a layer, a film, a region, or a plate is referred to as being 'under' or 'on a lower portion of' another layer, film, region, or plate, it can be directly under the other layer, film, region, or plate, or an intervening layer, film, region, or plate may also be present. Also, in this specification, "being disposed on" may include that is disposed on a lower portion as well as an upper portion.

In this specification, "being in direct contact" may mean that there is no layer, film, region, plate, or the like between a portion of the layer, film, region, or plate and the other portion. For example, "being in direct contact" may mean being disposed without using" additional member such and an adhesion member between two layers or two members.

Hereinafter, a panel transfer tray according to an embodiment of the present invention will be described with reference to the accompanying drawings.

Figure 1B:
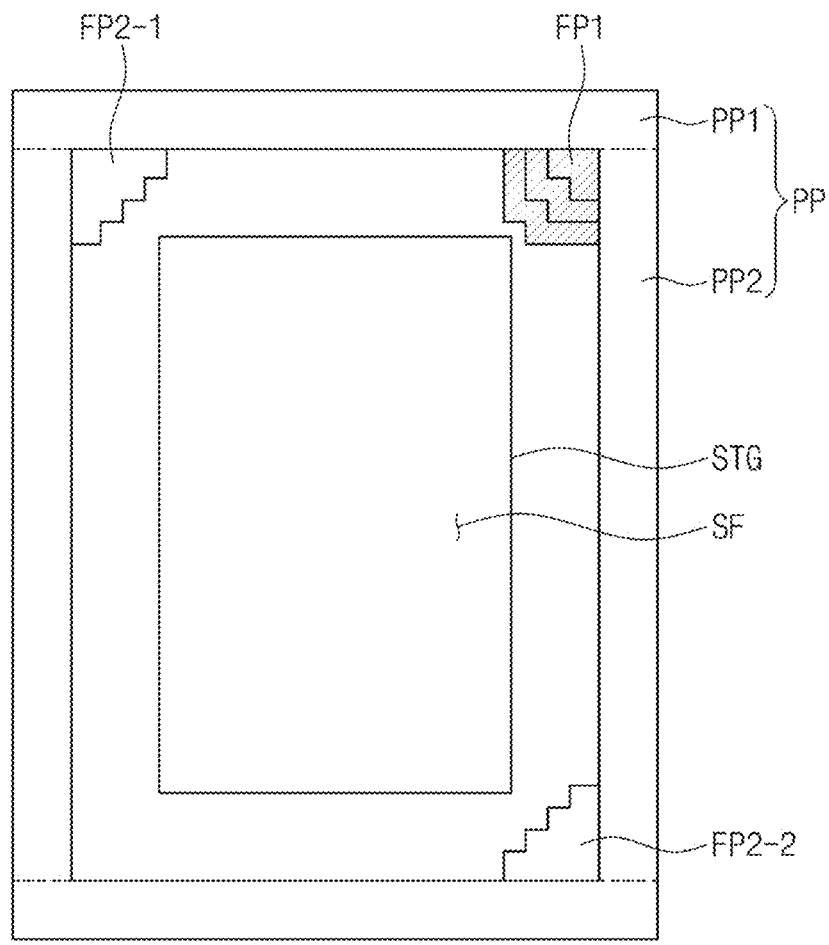
FIG. 1B is a schematic plan view of the panel transfer tray according to an embodiment of the present invention.

FIG. 1A is a schematic perspective view of a panel transfer tray according to an embodiment of the present invention. FIG. 1B is a schematic plan view of the panel transfer tray according to an embodiment of the present invention. FIG. 1B illustrates a plane that is parallel to a plane defined by a first direction DR1 and a second direction DR2 in the panel transfer tray 10 according to an embodiment of the present invention.

In descriptions of the panel transfer tray 10 according to an embodiment of the present invention with reference to FIGS. 1A and 1B, in FIGS. 1A and 1B, upward and downward directions of the panel transfer tray 10 are indicated in a third direction DR3. However, the directions indicated by the first to third directions DR1, DR2, and DR3 are relative concepts and may be converted to different directions. In this specification, the meaning of "when viewed on a plane" may mean a case when viewed in the third direction DR3 (i.e., in a plan view). Also, a "thickness direction" may mean the third direction DR3.

Referring to FIGS. 1A and 1B, the panel transfer tray 10 according to an embodiment includes an accommodation part SP, a protrusion PP protruding from the accommodation part SP in the third direction DR3, and a first movement prevention member FP1 disposed at one side of the accommodation part SP and disposed adjacent to the protrusion PP.

A space for accommodating a target panel may be defined in the accommodation part SP. The protrusion PP may protrude in the third direction DR3, which is an upward direction along an upper edge of the accommodation part SP, and an accommodation space may be defined in the accommodation part SP by the protrusion PP and a lower portion of the accommodation part SP.

A stage STG may be disposed in the inner space of the accommodation part SP. An accommodation surface SF on which the target panel is mounted may be defined on the stage STG. The accommodation surface SF may be parallel to the plane defined by the first direction DR1 and the second direction DR2. In another embodiment, the stage STG may be omitted, and the accommodation surface SF may be defined under the accommodation part SP. The stage STG may include or be made of a material for absorbing an impact to prevent the accommodated target panel from being damaged by the impact applied during the transferring. In an embodiment, the stage STG may include or be made of a Styrofoam material such as expanded polystyrene ("EPS") or expanded polypropylene ("EPP"). The stage STG may provide the accommodation surface SF on which the target panel is seated and simultaneously may perform a function of preventing components connected to the target panel from dropping.

The protrusion PP may include a first protrusion PP1 protruding along an upper edge (i.e., an edge facing the protrusion PP) of the accommodation part SP to extend along the first direction DR1, and a second protrusion PP2 protruding along an upper edge of the accommodation part SP to extend along the second direction DR2.

The first movement prevention member FP1 may be disposed on one corner of the accommodation part SP and may be disposed adjacent to the protrusion PP. The first movement prevention member FP1 may be in contact with the protrusion PP, and in particular, may be disposed adjacent to a connection point at which the first protrusion PP1 and the second protrusion PP2 are connected to each other. That is, the first movement prevention member FP1 may be disposed to be adjacent to one vertex of the protrusion PP having a rectangular shape when viewed on the plane. Although not shown, the first movement prevention member FP1 may be disposed on one corner of the accommodation part SP and be coupled to the accommodation part SP through a unit to be coupled to the accommodation part SP so as not to be dislocated in position even in the movement of the panel transfer tray 10.

The panel transfer tray 10 according to an embodiment may further include a second movement prevention member FP2 disposed on another corner of the accommodation part SP spaced apart from the one corner of the accommodation part SP at which the first movement prevention member FP1 is disposed. The second movement prevention member FP2 may include a first sub movement prevention member FP2-1 spaced apart from the first movement prevention member FP1 in the first direction DR1 and a second sub movement prevention member FP2-2 spaced apart from the first movement prevention member FP1 in the second direction DR2. Each of the first sub movement prevention member FP2-1 and the second sub movement prevention member FP2-2 may be disposed at the connection point at which the first protrusion PP1 and the second protrusion PP2 are connected to each other, i.e., one vertex of the protrusion PP. Although not shown, the second movement prevention member FP2 may be disposed on one corner of the accommodation part SP and be coupled to the accommodation part SP through a unit to be coupled to the accommodation part SP so as not to be dislocated in position even in the movement of the panel transfer tray 10.

Figure 2:
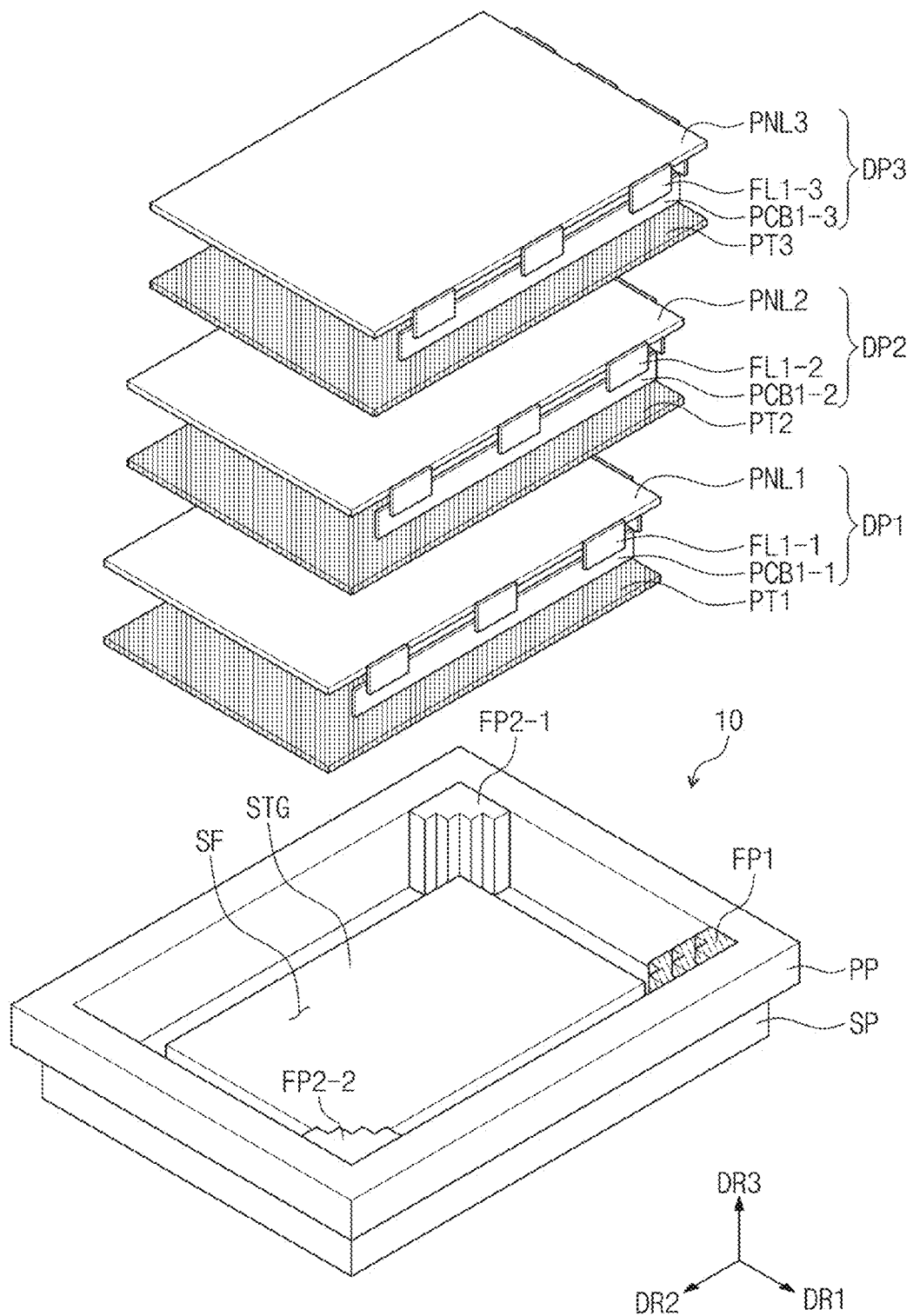
FIG. 2 is a schematic perspective view of the panel transfer tray and a target panel accommodated in the panel transfer tray according to an embodiment of the present invention.
Figure 3A:
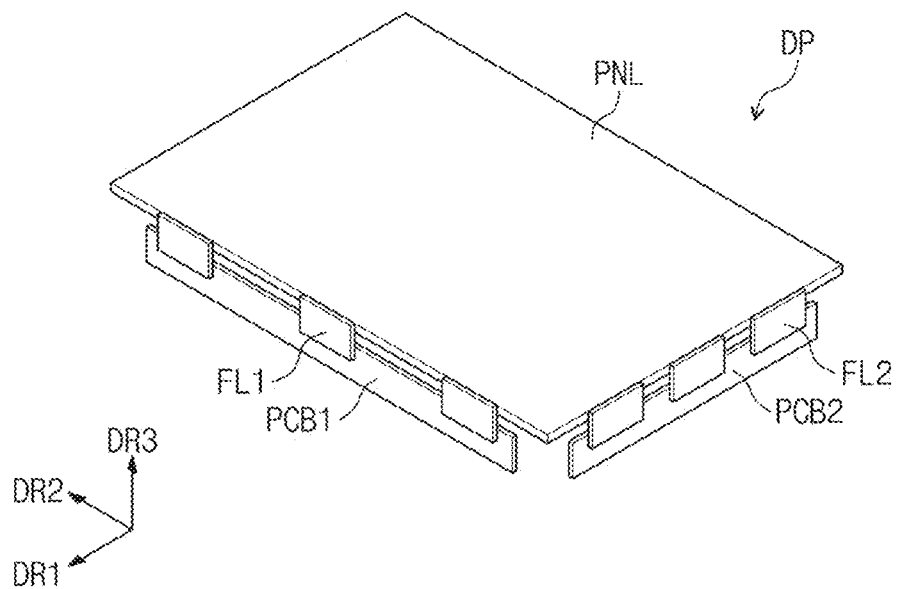
FIGS. 3A and 3B are schematic perspective views of the target panel and a protective pad, which are accommodated in the panel transfer tray, according to an embodiment of the present invention.
Figure 3B:
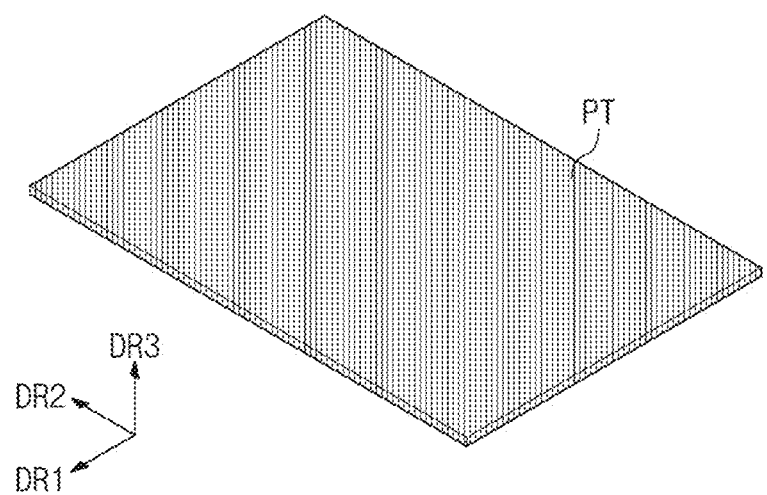

FIG. 2 is a schematic perspective view of the panel transfer tray and the target panel accommodated in the panel transfer tray according to an embodiment of the present invention. FIGS. 3A and 3B are schematic perspective views of the target panel and a protective pad, which are accommodated in the panel transfer tray, according to an embodiment of the present invention.

Referring to FIGS. 2, 3A, and 3B together, a target panel DP and a protective pad PT may be accommodated in the panel transfer tray 10 according to an embodiment of the present invention. In FIG. 2, first to third protective pads PT-1, PT-2, and PT-3 and first to third target panels DP-1, DP-2, and DP-3 are accommodated in the panel transfer tray 10 according to an embodiment, but the invention is not limited thereto. For example, two target panels and protective pads may be accommodated in the panel transfer tray, and also, four or more and fifteen or less target panels and protective pads may be accommodated. Preferably, the panel transfer tray may accommodate three or more and six or less target panels and protective pads in another embodiment.

Referring to FIG. 3A, the target panel DP according to an embodiment of the present invention may be a display panel. The target panel DP may include a panel body part PNL and film parts FL1 and FL2 connected to the panel body part PNL. The panel body part PNL may be disposed to parallel to the plane defined by the first direction DR1 and the second direction DR2. The film parts FL1 and FL2 may include a first film part FL1 connected to a long side (i.e., a longitudinal side) of the panel body part PNL, which extends along the second direction DR2, and a second film part FL2 connected to a short side (i.e., a latitudinal side) of the panel body part PNL, which extends along the first direction DR1. In an embodiment, the film parts FL1 and FL2 are flexible circuit boards, and circuit boards PCB1 and PCB2 may be connected to sides of the film parts FL1 and FL2 opposite to the panel body part PNL. The film parts FL1 and FL2 may be connected to the panel body part PNL to extend along the third direction DR3 crossing the first direction DR1 and the second direction DR2.

Referring again to FIGS. 2, 3A, and 3B together, when the target panel DP according to an embodiment of the present invention is accommodated, the protective pad PT may be disposed between the plurality of accommodated target panels DP-1, DP-2, and DP-3. The protective pad PT may be disposed between the plurality of target panels DP-1, DP-2, and DP-3 to prevent each of the target panels DP-1, DP-2, and DP-3 from being damaged by an impact generated between the plurality of target panels DP-1, DP-2, and DP-3. In an embodiment, the protective pad PT may include or be made of a Styrofoam material such as expanded polystyrene (EPS) or expanded polypropylene (EPP).

Figure 4:
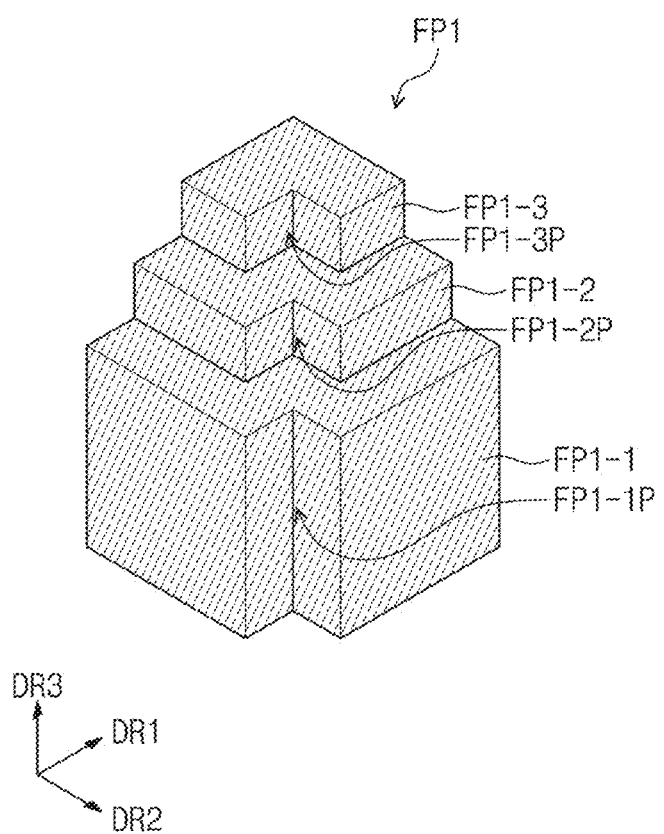
FIG. 4 is a perspective view of a first movement prevention member according to an embodiment of the present invention.
Figure 5A:
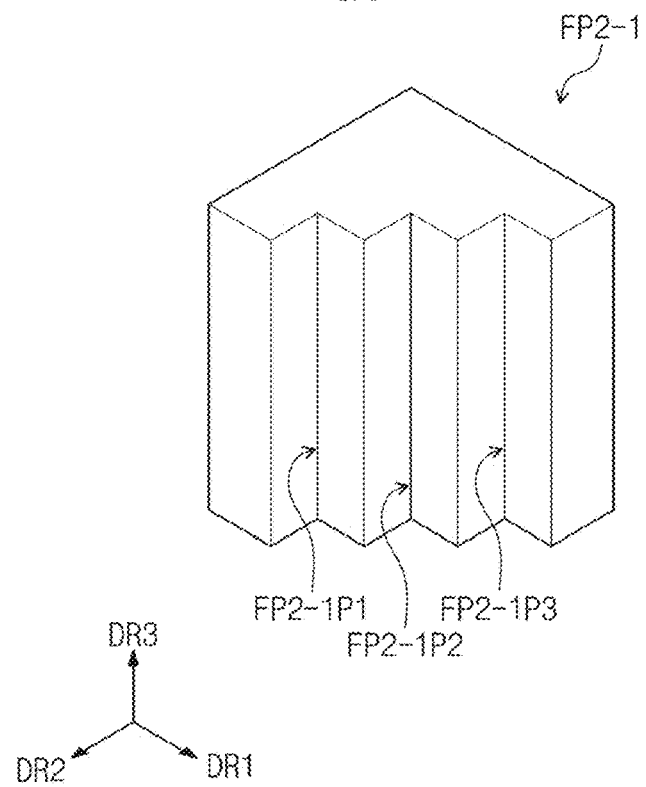
FIGS. 5A and 5B are perspective views of a second movement prevention member according to an embodiment of the present invention.
Figure 5B:
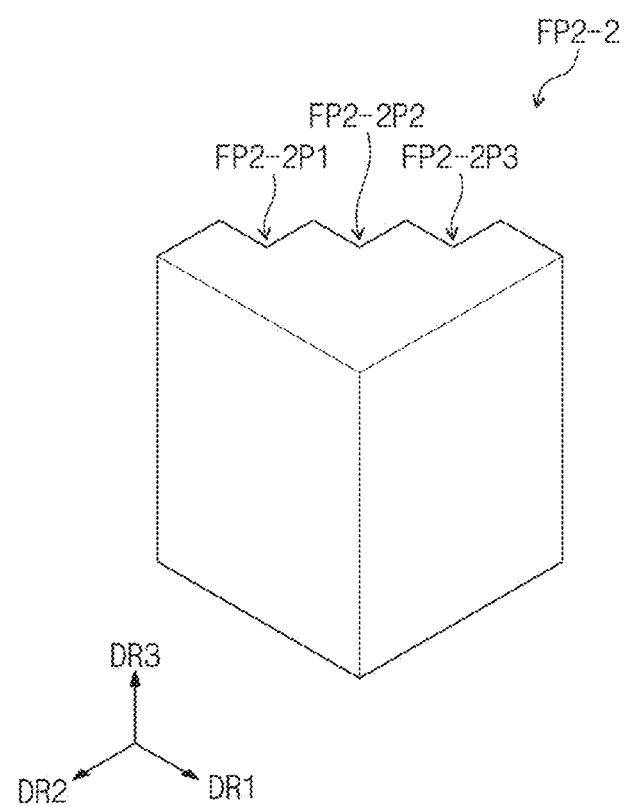

FIG. 4 is a perspective view of the first movement prevention member according to an embodiment of the present invention. FIGS. 5A and 5B are perspective views of the second movement prevention member according to an embodiment of the present invention.

Referring to FIG. 4, the first movement prevention member FP1 according to an embodiment of the present invention has a stair shape of which a planar area parallel to the plane defined by the first direction DR1 and the second direction DR2 is reduced along a third direction DR3 that is the upward direction. The first movement prevention member FP1 may include a first layer FP1-1, a second layer FP1-2, and a third layer FP1-3. In FIG. 4, the first movement prevention member FP1 is exemplarily illustrated to be provided as three layers, but the present invention is not limited thereto. The first movement prevention member FP1 may be provided in number of layers, which corresponds to the number of target panels accommodated in the panel transfer tray.

In the first movement prevention member FP1 according to an embodiment, the first layer FP1-1, the second layer FP1-2, and the third layer FP1-3 may be sequentially laminated along the third direction DR3 and may gradually decrease in planar area toward in the upward direction along the third direction DR3. That is, the second layer FP1-2 may have a planar area less than the planar area of the first layer FP1-1, and the third layer FP1-3 may have a planar area less than the planar area of the second layer FP1-2.

Each layer of the first movement prevention member FP1 may define a fixing part, which fixes the target panel. The first layer FP1-1 may define a first fixing part FP1-1P, the second layer FP1-2 may define a second fixing part FP1-2P, and the third layer FP1-3 may define a third fixing part FP1-3P. Each of the fixing parts FP1-1P, FP1-2P, and FP1-3P has a shape buried in the first direction DR1 and the second direction DR2 when viewed on the plane and may perform a function of fixing an end of the target panel accommodated in the panel transfer tray 10.

Referring to FIGS. 5A and 5B, the second movement prevention member according to an embodiment of the present invention may include a first sub movement prevention member FP2-1 and a second sub movement prevention member FP2-2, and each of the first sub movement prevention member FP2-1 and the second sub movement prevention member FP2-2 may have a shape that alternately extends along the first direction DR1 and the second direction DR2 when viewed on the plane. That is, each of the first sub movement prevention member FP2-1 and the second sub movement prevention member FP2-2 may have a stair shape that alternates along the first direction DR1 and the second direction DR2 in one side thereof when viewed on the plane. The first sub movement prevention member FP2-1 may define first to third fixing parts FP2-1P1, FP2-1P2, and FP2-1P3 for fixing the target panel. The second sub movement prevention member FP2-2 may define first to third fixing parts FP2-2P1, FP2-2P2, and FP2-2P3 for fixing the target panel.

Hereinafter, a method for transferring a panel according to an embodiment of the present invention will be described with reference to the drawings.

The method for transferring the panel according to an embodiment of the present invention includes a process of sequentially loading a plurality of panels on a transfer tray and a process of moving a transfer tray on which the plurality of panels is loaded.

Figure 6A:
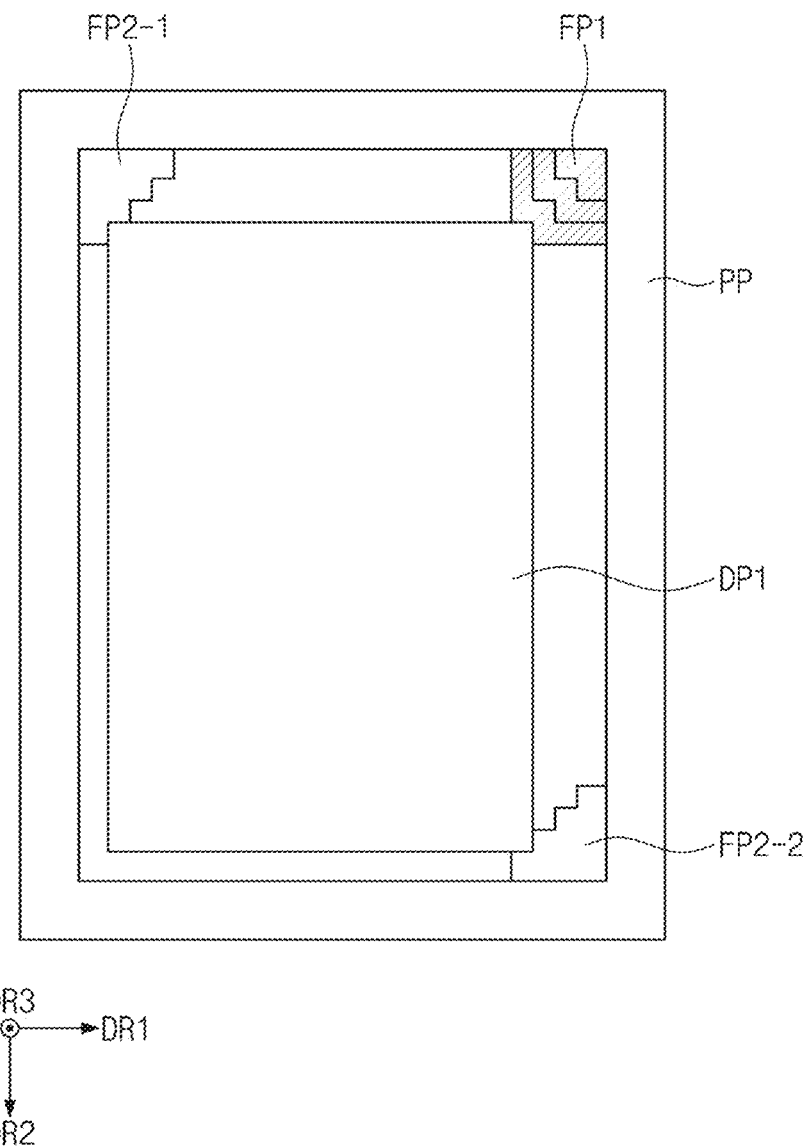
FIGS. 6A to 6C are plan views illustrating partial processes of a method for transferring a panel according to an embodiment of the present invention.
Figure 6B:
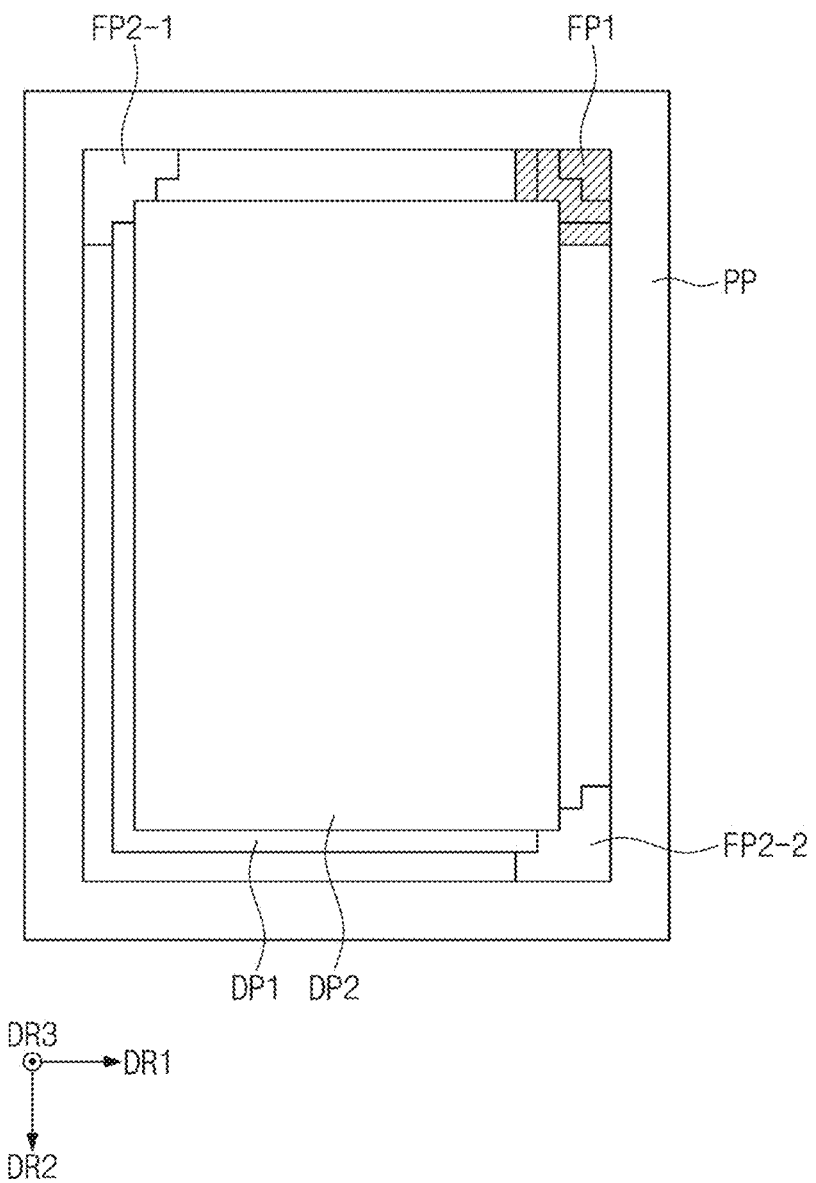
Figure 6C:
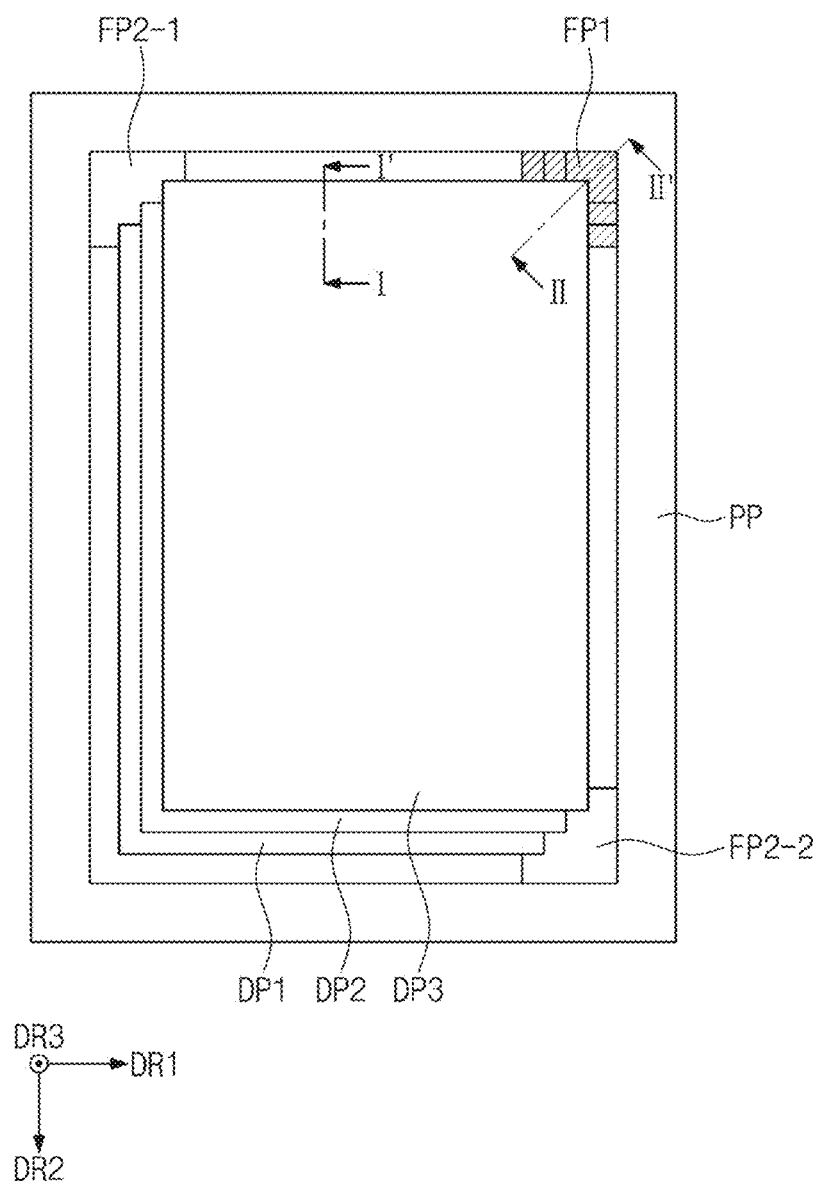
Figure 6D:
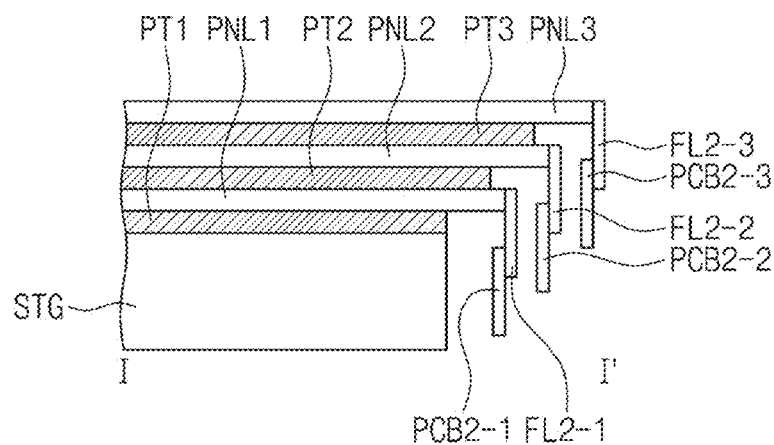
FIG. 6D is a cross-sectional view taken along line I-I' of FIG. 6C.
Figure 6E:
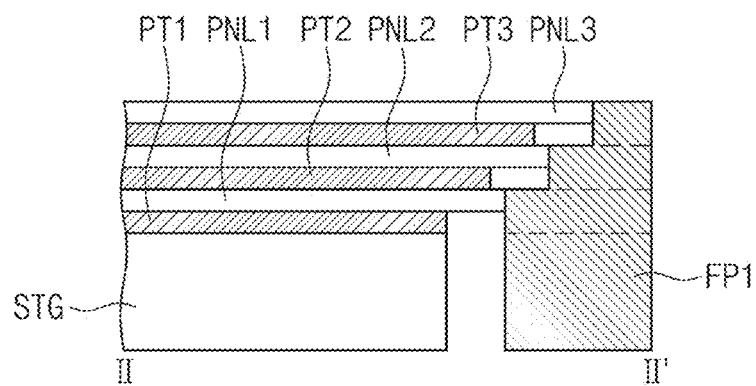
FIG. 6e is a cross-sectional view taken along line II-IF of FIG. 6C.

FIGS. 6A to 6C are plan views illustrating partial processes of the method for transferring the panel according to an embodiment of the present invention. FIG. 6D is a cross-sectional view taken along line I-I' of FIG. 6C. FIG. 6E is a cross-sectional view taken along line II-II' of FIG. 6C. Hereinafter, in description with reference to FIGS. 6A to 6E, the same reference numerals are used for the above-described components, and duplicated descriptions thereof will be omitted.

Referring to FIGS. 2 to 5B and 6A together, the process of loading the plurality of panels in the method for transferring the panel according to an embodiment includes a process of loading a first panel DP1 on a panel transfer tray 10 so as to be parallel to the plane defined by the first direction DR1 and the second direction DR2. The first panel DP1 may be seated on a stage STG of the panel transfer tray 10. In the process of loading the plurality of panels, before the first panel DP1 is seated on the stage STG, a process of loading a first protective pad PT1 on the stage STG may be further performed.

In the process of loading the first panel DP1 on the panel transfer tray 10, the first panel DP1 may be fixed by a first movement prevention member FP1 and second movement prevention members FP2-1 and FP2-2. More specifically, the first panel DP1 may be fixed by a first fixing part FP1-1P of the first movement prevention member FP1, a first fixing part FP2-1P1 of the first sub movement prevention member FP2-1, and a first fixing part FP2-2P1 of the second sub movement prevention member FP2-2. As the first panel DP1 is fixed by the three movement prevention members, when the panel is loaded on the transfer tray to move, the panel may be stably transferred without the movement of the panel to prevent the panel from being damaged.

Referring to FIGS. 2 to 5B and 6B together, the process of loading the plurality of panels in the method for transferring the panel according to an embodiment includes a process of loading a second panel DP2 on the panel transfer tray 10 so as to be parallel to a plane defined by the first direction DR1 and the second direction DR2. The second panel DP2 is loaded on the first panel DP1. The second panel DP2 is loaded to be shifted by a predetermined distance from the first panel along each of the first and second directions DR1 and DR2 when viewed on the plane. Before the second panel DP2 is loaded on the first panel DP1, a process of loading the second protective pad PT2 on the first panel DP1 may be further performed.

In the process of loading the second panel DP2 on the panel transfer tray 10, the second panel DP2 may be fixed by a first movement prevention member FP1 and second movement prevention members FP2-1 and FP2-2. More specifically, the second panel DP2 may be fixed by a second fixing part FP1-2P of the first movement prevention member FP1, a second fixing part FP2-1P2 of the first sub movement prevention member FP2-1, and a second fixing part FP2-2P2 of the second sub movement prevention member FP2-2. As the second panel DP2 is fixed by the three movement prevention members, when the panel is loaded on the transfer tray to move, the panel may be stably transferred without the movement of the panel to prevent the panel from being damaged.

Referring to FIGS. 2 to 5B and 6C together, the process of loading the plurality of panels in the method for transferring the panel according to an embodiment includes a process of loading a third panel DP3 on a panel transfer tray 10 so as to be parallel to a plane defined by the first direction DR1 and the second direction DR2. The third panel DP3 is loaded on the second panel DP2. The third panel DP3 is loaded to be shifted by a predetermined distance from each of the first panel DP1 and the second panel DP2 along each of the first and second directions DR1 and DR2 when viewed on the plane. Before the third panel DP3 is loaded on the second panel DP2, a process of loading the third protective pad PT3 on the second panel DP2 may be further performed.

In the process of loading the third panel DP3 on the panel transfer tray 10, the third panel DP3 may be fixed by a first movement prevention member FP1 and second movement prevention members FP2-1 and FP2-2. More specifically, the third panel DP3 may be fixed by a third fixing part FP1-3P of the first movement prevention member FP1, a third fixing part FP2-1P3 of the first sub movement prevention member FP2-1, and a third fixing part FP2-2P3 of the second sub movement prevention member FP2-2. As the third panel DP3 is fixed by the three movement prevention members, when the panel is loaded on the transfer tray to move, the panel may be stably transferred without the movement of the panel to prevent the panel from being damaged.

Referring to FIGS. 6C and 6D, in the method for transferring to the panel according to an embodiment, each of the first panel DP1, the second panel DP2, and the third panel DP3 may be loaded to be shifted by a first predetermined distance along the first direction DR1 and a second predetermined distance along the second direction DR2. Thus, a film part FL2-1 connected to the first panel DP1, a film part FL2-2 connected to the second panel DP2, and a film part FL2-3 connected to the third panel DP3 may be disposed to be spaced apart from each other along the first and second directions DR1 and DR2 without overlapping each other when viewed on the plane defined by the first and second directions DR1 and DR2. In the method for transferring the panel according to an embodiment, since each of the first panel DP1, the second panel DP2, and the third panel DP3 is loaded to be shifted by the first predetermined distance along the first direction DR1 and the second predetermined distance along the second direction DR2, the film parts FL2-1, FL2-2, and FL2-3, which are connected to panel body parts PNL1, PNL2, and PNL3 to extend in the third direction DR3, may not overlap each other when viewed on the plane, and thus, the plurality of target panels may be loaded without damaging the target panels.

Referring to FIGS. 6D and 6E, in the method for transferring to the panel according to an embodiment, each of the first panel DP1, the second panel DP2, and the third panel DP3 may be disposed to be shifted by a predetermined distance along the first direction DR1 and the second direction DR2 (more specifically, a first predetermined distance along the first direction DR1 and a second predetermined distance along the second direction DR2) and then be fixed to one side of the first movement prevention member FP1. In the method for transferring the panel according to an embodiment of the present invention, since the first movement prevention member FP1 has a stair shape of which a planar area gradually decreases in an upward direction, even though the loaded panels are loaded to be shifted in the first direction DR1 and the second direction DR2, the loaded panels may be fixed by the first movement prevention member FP1 without movement.

Figure 7:
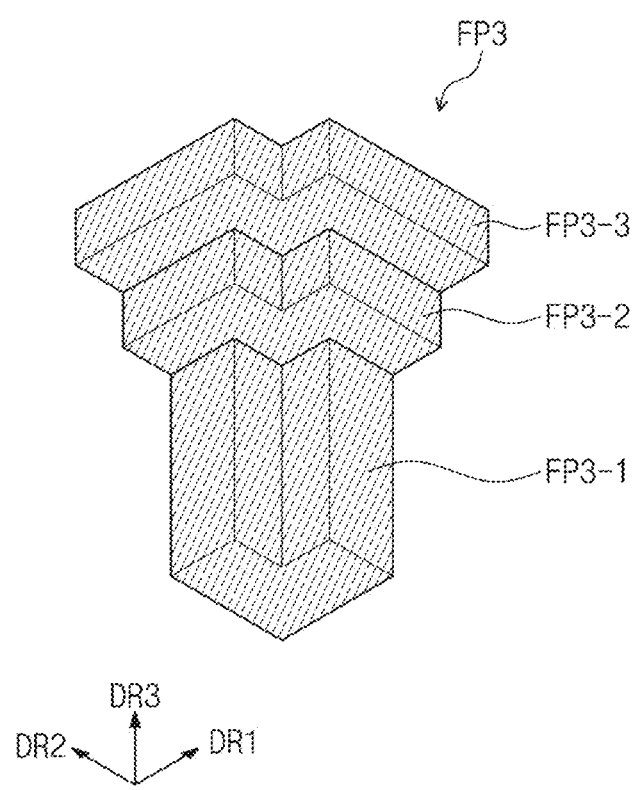
FIG. 7 is a perspective view of a third movement prevention member included in a panel transfer tray according to another embodiment of the present invention.
Figure 8A:
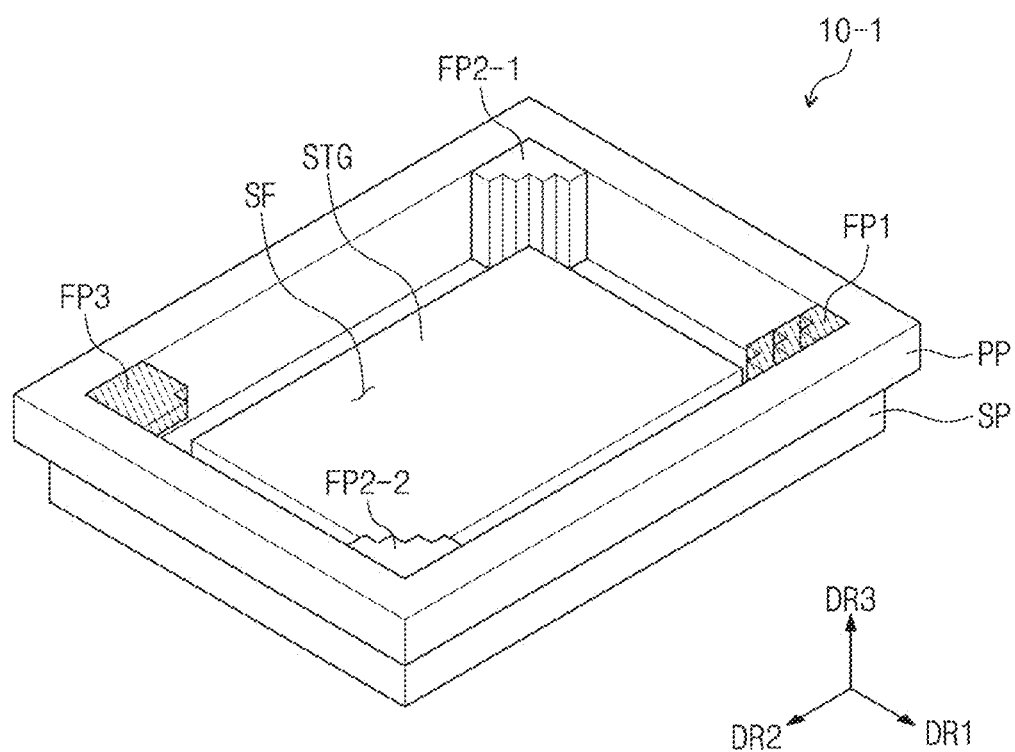
FIG. 8A is a schematic perspective view of the panel transfer tray according to another embodiment of the present invention.
Figure 8B:
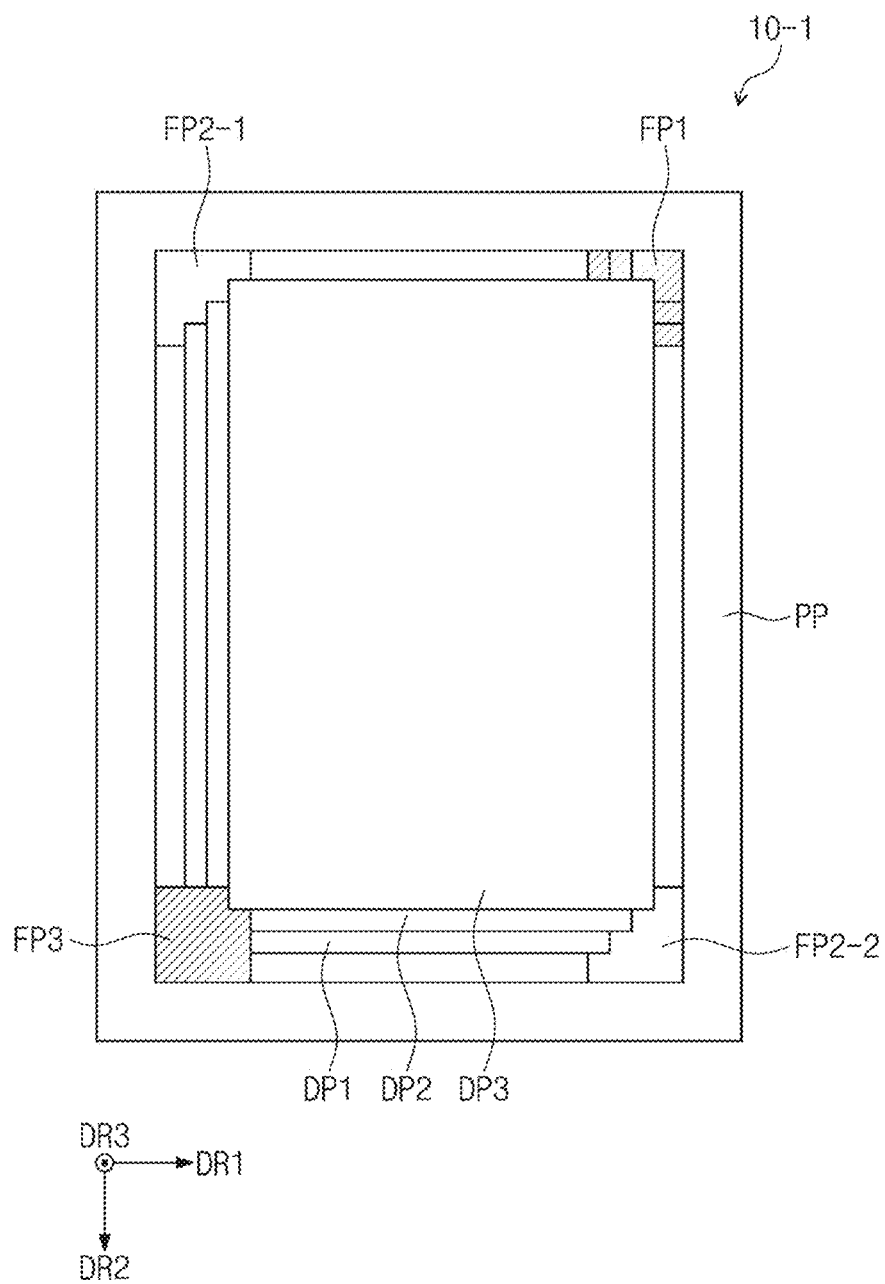
FIG. 8B is a plan view illustrating partial processes of a method for transferring a tray according to another embodiment of the present invention.

FIG. 7 is a perspective view of a third movement prevention member included in a panel transfer tray according to another embodiment of the present invention. FIG. 8A is a schematic perspective view of the panel transfer tray according to another embodiment of the present invention. FIG. 8B is a plan view illustrating partial processes of a method for transferring a tray according to another embodiment of the present invention. Hereinafter, a panel transfer tray and a method for transferring a panel according to another embodiment of the present invention will be described with reference to FIGS. 7, 8A and 8B. Hereinafter, in description with reference to FIGS. 7, 8A to 8E, the same reference numerals are used for the above-described components, and duplicated descriptions thereof will be omitted.

Referring to FIGS. 7 and 8A, a panel transfer tray 10-1 according to an embodiment of the present invention may further include a third movement prevention member FP3 spaced apart from a first movement prevention member FP1 and second movement prevention members FP2-1 and FP2-2. The third movement prevention member FP3 may be spaced apart from the first movement prevention member FP1 along the first and second directions DR1 and DR2 (i.e., along a diagonal direction) and may be disposed on an opposite corner of a protrusion PP with respect to the first movement prevention member FP1. The third movement prevention member FP3 may be spaced apart from the first sub movement prevention member FP2-1 along the second direction DR2, and the second sub movement prevention member FP2-2 may be spaced apart from the second sub movement prevention member FP2-2 along the first direction DR1.

The third movement prevention member FP3 may have an inverted stair shape of which a planar area gradually increases along the third direction DR3. The third movement prevention member FP3 may include a first layer FP3-1, a second layer FP3-2, and a third layer FP3-3, which are sequentially laminated along the third direction DR3. The second layer FP3-2 may have a planar area greater than that of the first layer FP3-1, and the third layer FP3-3 may have a planar area greater than that of the second layer FP3-2 when viewed in the plane.

Referring to FIGS. 7, 8A and 8B, the method of transferring the panel according to an embodiment of the present invention may further include a process of disposing a third movement prevention member FP3. The third movement prevention member FP3 may be disposed after all the target panels are loaded on the transfer tray. The third movement prevention member FP3 may be disposed on a third panel DP3 to fix the target panels after all the first panel DP1, the second panel DP2, and the third panel DP3 are accommodated in a panel transfer tray 10-1. In the method for transferring the panel according to an embodiment, the third movement prevention member FP3 may be additionally disposed at one corner at which a first movement prevention member FP1 and second movement prevention members FP2-1 and FP2-2 are not disposed. Thus, since the target panels are fixed by the four movement prevention members, when the panel is loaded on the transfer tray to move, the panel may be stably transferred and be prevented from being damaged.

It will be apparent to those skilled in the art that various modifications and deviations can be made in the present invention. Thus, it is intended that the present invention covers the modifications and deviations of this invention provided they come within the scope of the appended claims and their equivalents.

Therefore, the technical scope of the present invention is not limited to the contents described in the detailed description of the specification, but should be determined by the claims.

INDUSTRIAL APPLICABILITY

In order to implement the front display device, various methods of reducing the dead space of the display device have been developed. However, in the case of attaching the circuit board vertically to the display panel to reduce the dead space of the display device, the plurality of display panels may not be laminated to be transferred and stored through the existing method, and thus, the transfer and storage costs of the display device may increase. Therefore, the present invention capable of laminating the plurality of display panels applied to the display device while reducing the dead space of the display device has high industrial applicability.

The invention claimed is:

1. A panel transfer tray comprising:
an accommodation part which accommodates a target panel;
a protrusion protruding an upward direction from an upper edge of the accommodation part;
a first movement prevention member disposed at a first corner of the accommodation part and disposed adjacent to the protrusion; and
a second movement prevention member disposed at a second corner spaced apart from the first corner at which the first movement prevention member is disposed,
wherein the first movement prevention member has a stair shape of which a planar area gradually decreases along the upward direction in a plan view, and
the second movement prevention member has a shape that alternately extends along a first direction and a second direction crossing the first direction in the plan view, and the first direction and the second direction cross the upward direction.

2. The panel transfer tray of claim 1, wherein the accommodation part comprises an accommodation surface parallel to a plane defined by the first direction and the second direction.

3. The panel transfer tray of claim 2, wherein the protrusion comprises:
a first protrusion extending along the first direction; and
a second protrusion extending along the second direction,
wherein the first movement prevention member is disposed adjacent to a connection point at which the first protrusion and the second protrusion are connected to each other.

4. The panel transfer tray of claim 1, wherein the second movement prevention member comprises:
a first sub movement prevention member spaced apart from the first movement prevention member along the first direction; and
a second sub movement prevention member spaced apart from the first movement prevention member along the second direction.

5. The panel transfer tray of claim 4, further comprising: a third movement prevention member disposed to be spaced apart from the first movement prevention member along the first direction and the second direction, spaced apart from the first sub movement prevention member along the second direction, and spaced apart from the second sub movement prevention member along the first direction.

6. The panel transfer tray of claim 5, wherein the third movement prevention member has an inverted stair shape of which a planar area gradually increases along the upward direction.

7. The panel transfer tray of claim 2, wherein the first movement prevention member comprises a first layer, a second layer, and a third layer, which are sequentially laminated along the upward direction,
wherein the second layer has a planar area less than a planar area of the first layer, and
the third layer has a planar area less than the planar area of the second layer.

8. The panel transfer tray of claim 7, wherein each of the first layer, the second layer, and the third layer of the first movement prevention member defines a fixing part recessed in the first direction and the second direction in the plan view to fix the target panel.

9. The panel transfer tray of claim 2, further comprising a stage which is disposed at a center of the accommodation part and on which the accommodation surface is defined so that the target panel is seated.

* * * * *